(12) United States Patent
Fujii et al.

(10) Patent No.: US 10,819,865 B2
(45) Date of Patent: Oct. 27, 2020

(54) INFORMATION PROCESSING APPARATUS FOR DETERMINING WHETHER TO DISPLAY AN EVENT MESSAGE

(71) Applicant: FUJI XEROX CO., LTD., Tokyo (JP)

(72) Inventors: Toshihide Fujii, Kanagawa (JP); Masatoshi Tagawa, Kanagawa (JP); Naoko Sato, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/386,410

(22) Filed: Apr. 17, 2019

(65) Prior Publication Data

US 2019/0245991 A1  Aug. 8, 2019

Related U.S. Application Data

(63) Continuation of application No. 15/694,251, filed on Sep. 1, 2017, now Pat. No. 10,298,787.

(30) Foreign Application Priority Data

Mar. 3, 2017 (JP) ................. 2017-040307

(51) Int. Cl.
*H04N 1/00* (2006.01)
*H04N 1/32* (2006.01)
*H04N 1/21* (2006.01)

(52) U.S. Cl.
CPC ..... *H04N 1/00411* (2013.01); *H04N 1/00477* (2013.01); *H04N 1/21* (2013.01); *H04N 1/32625* (2013.01); *H04N 2201/0094* (2013.01)

(58) Field of Classification Search
None
See application file for complete search history.

(56) References Cited

U.S. PATENT DOCUMENTS

| 2007/0197195 A1* | 8/2007 | Sugiyama | G06Q 30/02 455/412.2 |
| 2010/0110480 A1 | 5/2010 | Satake | |
| 2011/0199645 A1* | 8/2011 | Ito | H04N 1/00474 358/1.15 |
| 2013/0113823 A1 | 5/2013 | Umezawa et al. | |
| 2015/0156353 A1* | 6/2015 | Kubota | H04N 1/00076 358/1.14 |
| 2016/0381237 A1* | 12/2016 | Sakaida | H04N 1/00517 358/1.15 |
| 2019/0124172 A1* | 4/2019 | Arabo | H04L 29/08693 |

FOREIGN PATENT DOCUMENTS

| JP | H06-052018 A | 2/1994 |
| JP | 2002-232626 A | 8/2002 |
| JP | 2011-039874 A | 2/2011 |

OTHER PUBLICATIONS

Jun. 22, 2018 Office Action issued in U.S. Appl. No. 15/694,251.

* cited by examiner

*Primary Examiner* — Benjamin O Dulaney
(74) *Attorney, Agent, or Firm* — Oliff PLC (57) ABSTRACT

An information processing apparatus includes a display screen and a display controller. The display screen displays a first message corresponding to a first event occurring in the information processing apparatus. The display controller controls, in a case where a second event occurs while the first message is being displayed on the display screen, a display mode of a second message corresponding to the second event, based on a relationship between the first event and the second event.

2 Claims, 6 Drawing Sheets

FIG. 2

| CODE | MAIN PURPOSE | SUB-PURPOSE | LAYER | DISPLAY MODE | MESSAGE | SUB-APPLICATION | PRIORITY |
|---|---|---|---|---|---|---|---|
| E001 | ERROR NOTIFICATION | NOTIFICATION OF FAILURE OF APPARATUS | UPPER LAYER (FOURTH ROW) | FULL-SCREEN DISPLAY | FAILURE HAS OCCURRED. | COPY | 10 |
| E002 | ERROR NOTIFICATION | NOTIFICATION INDICATING THAT SERVICE MAY NOT BE EXECUTED DUE TO SOME REASON | UPPER LAYER (FOURTH ROW) | FULL-SCREEN DISPLAY | NETWORK IS DISCONNECTED. | ScanToMail | 9 |
| E003 | ERROR NOTIFICATION | NOTIFICATION INDICATING THAT SERVICE MAY NOT BE EXECUTED DUE TO SOME REASON | UPPER LAYER (FOURTH ROW) | FULL-SCREEN DISPLAY | PAPER JAM HAS OCCURRED. | COPY | 8 |
| W001 | WARNING (EXCEPT FOR WARNING REGARDING OPERATION) | NOTIFICATION OF LACK OF REMAINING CONSUMABLES | INTERMEDIATE LAYER (THIRD ROW) | POP-UP DISPLAY | TONER REPLACEMENT IS REQUIRED. | COPY | 7 |
| W002 | WARNING (EXCEPT FOR WARNING REGARDING OPERATION) | NOTIFICATION OF LACK OF REMAINING CONSUMABLES | INTERMEDIATE LAYER (THIRD ROW) | POP-UP DISPLAY | THERE IS NO PAPER LOADED IN TRAY 1. | COPY | 6 |
| I001 | NOTIFICATION REGARDING OPERATION | NOTIFICATION INDICATING THAT SERVICE FOR WHICH START INSTRUCTION IS ISSUED MAY NOT BE EXECUTED | LOWER LAYER (SECOND ROW) | POP-UP DISPLAY | START IS NOT AVAILABLE BECAUSE NO ADDRESS IS SPECIFIED. | ScanToMail | 5 |
| I002 | NOTIFICATION REGARDING OPERATION | NOTIFICATION OF PROGRESS STATUS OF SERVICE | LOWER LAYER (SECOND ROW) | POP-UP DISPLAY | PRINTING IS BEING PERFORMED. | COPY | 4 |
| I003 | NOTIFICATION REGARDING OPERATION | NOTIFICATION OF PROGRESS STATUS OF SERVICE | LOWER LAYER (SECOND ROW) | POP-UP DISPLAY | TRANSMISSION IS BEING PERFORMED. | ScanToMail | 3 |

INFORMATION PROCESSING APPARATUS FOR DETERMINING WHETHER TO DISPLAY AN EVENT MESSAGE

CROSS-REFERENCE TO RELATED APPLICATIONS

This application is a continuation of U.S. application Ser. No. 15/694,251 filed Sep. 1, 2017, which is based on and claims priority under 35 USC 119 from Japanese Patent Application No. 2017-040307 filed Mar. 3, 2017, the entire disclosures of which are herein incorporated by reference.

BACKGROUND

Technical Field

The present invention relates to an information processing apparatus and a non-transitory computer readable medium.

SUMMARY

According to an aspect of the invention, there is provided an information processing apparatus including a display screen and a display controller. The display screen displays a first message corresponding to a first event occurring in the information processing apparatus. The display controller controls, in a case where a second event occurs while the first message is being displayed on the display screen, a display mode of a second message corresponding to the second event, based on a relationship between the first event and the second event.

BRIEF DESCRIPTION OF THE DRAWINGS

Exemplary embodiments of the present invention will be described in detail based on the following figures, wherein:

FIG. 2 is a diagram illustrating an example of a message categorization table;

DETAILED DESCRIPTION

Hereinafter, exemplary embodiments of the present invention will be described with reference to drawings. In figures, components having substantially the same function are referred to with the same reference sign, and redundant explanation will be omitted.

Summary of Exemplary Embodiments

An information processing apparatus according to an exemplary embodiment includes a display screen that displays a first message corresponding to a first event occurring in the information processing apparatus, and a display controller that controls, in a case where a second event occurs while the first message is being displayed on the display screen, a display mode of a second message corresponding to the second event, based on a relationship between the first event and the second event.

Furthermore, an information processing apparatus according to an exemplary embodiment includes a display controller that controls, in a case where a different message is notified while a notified message is being displayed on a display screen, when a priority of the different message is higher than a priority of the message being displayed, such that the different message is preferentially displayed on the display screen. The priority of a message is synonymous with the priority of an event to be notified to a user by the message.

"Being preferentially displayed on the display screen" represents a case where the different message is displayed immediately, a case where the different message is displayed when the screen being displayed is closed, or the like.

For example, "messages" are categorized according to the purpose as follows:

(a) error notification (notification of a failure of an apparatus, notification indicating that a service may not be executed, etc.);

(b) warning (notification to prompt replacement or replenishing of consumables, etc.); and (c) notification regarding an operation (notification of an input error, a process status, etc.)

Messages are not necessarily categorized as above and may be categorized according to other purposes.

Exemplary Embodiments

Figure 1:
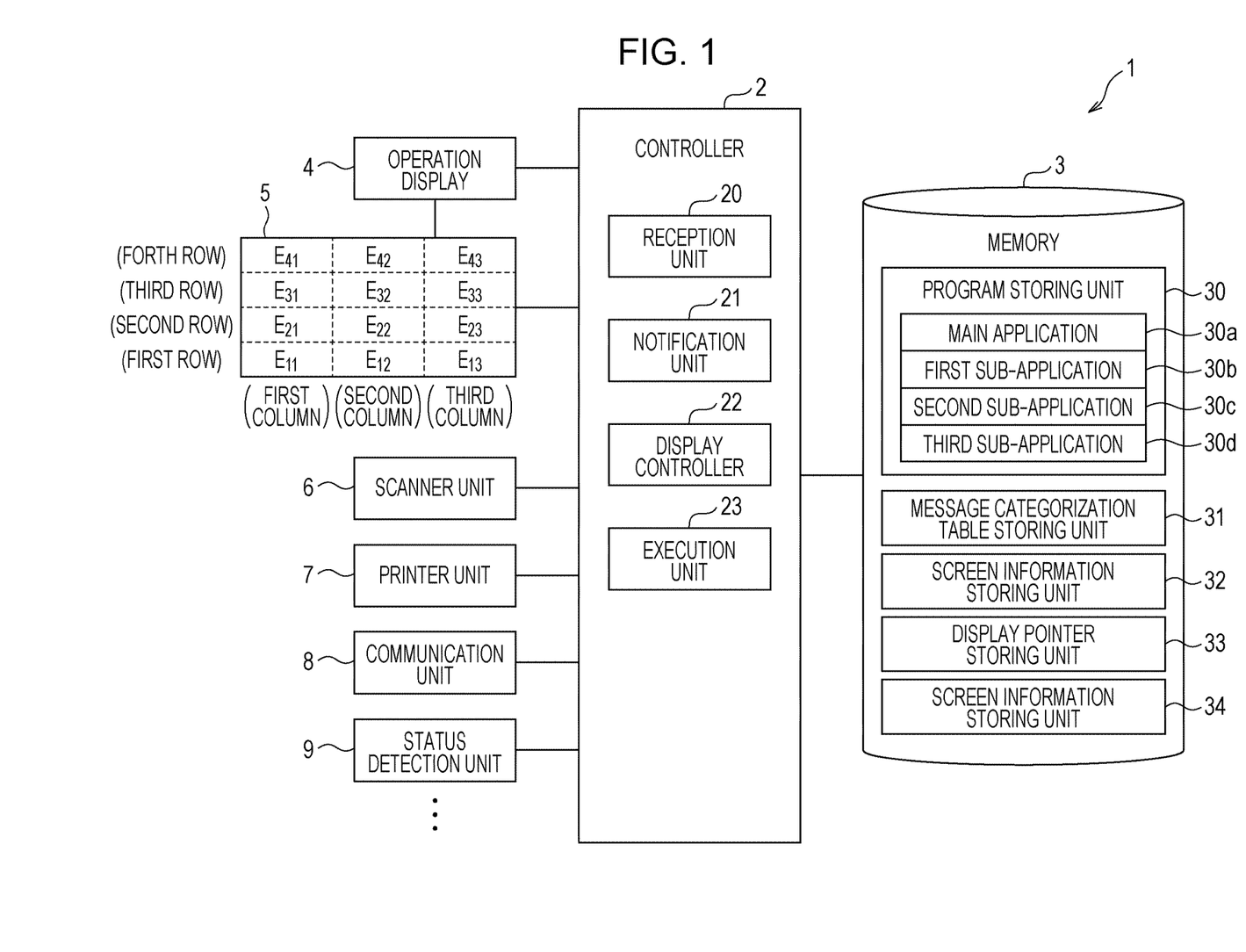
FIG. 1 is a block diagram illustrating a configuration example of an information processing apparatus according to an exemplary embodiment of the present invention.

FIG. 1 is a block diagram illustrating a configuration example of an information processing apparatus according to an exemplary embodiment of the present invention.

An information processing apparatus 1 is a multifunction apparatus having multiple functions such as scan, print, copy, ScanToMail, and the like. The information processing apparatus 1 includes a controller 2 that controls individual units of the information processing apparatus 1, a memory 3 that stores various types of information, an operation display 4 that receives an operation from a user and displays information, a display memory 5 for the operation display 4, a scanner unit 6 that reads an image from an original, a printer unit 7 that prints print data on paper, a communication unit 8 that communicates with an external apparatus via a network, and plural status detection units 9 that detect a status of the information processing apparatus 1. The information processing apparatus 1 may be, for example, a portable information processing apparatus such as a personal computer or a multifunction cellular phone (smartphone).

"Scan" is processing for reading, with the scanner unit 6, an image from an original. "Print" is processing for printing, with the printer unit 7, print data transmitted from an external apparatus on paper. "Copy" is processing for printing, with the printer unit 7, an image which is obtained by reading, with the scanner unit 6, an original on paper. "ScanToMail" is processing for reading, with the scanner unit 6, an original and transmitting, with the communication unit 8 and via a network, the read image to an external apparatus by electronic mail.

The controller 2 of the information processing apparatus 1 includes a central processing unit (CPU), an interface, and the like. The controller 2 functions as a reception unit 20, a notification unit 21, a display controller 22, an execution unit 23, and the like by operating in accordance with a program such as an application stored in a program storing unit 30 of the memory 3. The details of the reception unit 20, the notification unit 21, the display controller 22, and the execution unit 23 will be described later.

The memory 3 includes a read only memory (ROM), a random access memory (RAM), a hard disk, and the like. The memory 3 includes the program storing unit 30 that stores a program such as an application, a message categorization table storing unit 31 that stores a message categorization table 310 (see FIG. 2), a screen information storing unit 32 that stores screen information of a menu screen, a setting screen for a sub-application, a message notification screen, and the like, a display pointer storing unit 33 that stores a display pointer, and a screen information storing unit 34 that temporarily holds screen information. The message categorization table 310 is an example of registration information.

In the program storing unit 30, a main application 30a, a first sub-application 30b, a second sub-application 30c, and a third sub-application 30d are stored. In this example, the three sub-applications 30b to 30d are illustrated. In actuality, however, four or more sub-applications are stored in the program storing unit 30. The first to third sub-applications 30b to 30d control functions provided in the information processing apparatus 1. In the explanation provided below, the first to third sub-applications 30b to 30d control the "scan" function, the "copy" function, and the "ScanToMail" function, respectively. The main application 30a controls a menu screen displayed on the operation display 4. The menu screen is configured such that "scan", "copy", and "ScanTo-Mail", which are under the control by the first to third sub-applications 30b to 30d, may be selected.

In the message categorization table 310 stored in the message categorization table storing unit 31, a display mode of a message notification screen and the like is registered in association with a code. The details of the message categorization table 310 will be described later.

Setting screens for the first to third sub-applications 30b to 30d stored in the screen information storing unit 32 contain setting details set by default and "start" buttons for issuing an instruction to start the functions based on the first to third sub-applications 30b to 30d. A message notification screen stored in the screen information storing unit 32 is a screen containing a message associated with a code. The message notification screen contains information on configuring a screen, such as a message, an input field for inputting information, a "close" button for issuing an instruction to close the message notification screen, and the like.

(Configuration of Display Memory)

As illustrated in FIG. 1, the display memory 5 includes plural memory regions $E_{11}$, $E_{21}$, $E_{31}$, $E_{41}$, $E_{12}$, $E_{22}$, $E_{32}$, $E_{42}$, $E_{13}$, $E_{23}$, $E_{33}$, and $E_{43}$ which are provided for the individual sub-applications (the first to third sub-applications 30b to 30d) and individual layers (a background layer, a lower layer, an intermediate layer, and an upper layer). That is, in the display memory 5, the memory regions $E_{11}$, $E_{21}$, $E_{31}$, and $E_{41}$ in the first column correspond to the first sub-application (for example, scan) 30b, the memory regions $E_{12}$, $E_{22}$, $E_{32}$, and $E_{42}$ in the second column correspond to the second sub-application (for example, copy) 30c, and the memory regions $E_{13}$, $E_{23}$, $E_{33}$, and $E_{43}$ in the third column correspond to the third sub-application (for example, ScanToMail) 30d.

Furthermore, in the display memory 5, the memory regions $E_{11}$, $E_{12}$, and $E_{13}$ in the first row correspond to the background layer, the memory regions $E_{21}$, $E_{22}$, and $E_{23}$ in the second row correspond to the lower layer, the memory regions $E_{31}$, $E_{32}$, and $E_{33}$ in the third row correspond to the intermediate layer, and the memory regions $E_{41}$, $E_{42}$, and $E_{43}$ in the fourth row correspond to the upper layer. The number of layers other than the background layer is not limited to three and may be one, two, four, or more.

In the background layer, setting screens for the first to third sub-applications 30b to 30d are displayed. Message notification screens are displayed in the lower layer, the intermediate layer, and the upper layer.

(Configuration of Layers)

The upper layer is arranged on the front-most surface, and the background layer is arranged on the rear-most surface. The lower layer is arranged in front of the background layer, and the intermediate layer is arranged in front of the lower layer. The background layer, the lower layer, the intermediate layer, and the upper layer are transparent layers. Accordingly, when a screen is full-screen-displayed in a layer on an upper side, a screen displayed in a layer on a lower side is hidden by the screen on the upper side and may not be seen. Furthermore, when a screen is pop-up-displayed in a layer on an upper side, part of a screen displayed in a layer on a lower side is seen, and the screen in the layer on the upper side is seen to be superimposed on the screen displayed in the layer on the lower side. When a setting screen is displayed in the background layer and no message notification screen is displayed in the lower layer, the intermediate layer, or the upper layer, only the setting screen is seen. "Full-screen display" represents a state in which a screen with the same size as that of the display screen of the operation display 4 is displayed. "Pop-up display" represents a state in which a screen with a size smaller than that of the display screen of the operation display 4 is displayed on a screen displayed in a layer on a lower side.

The status detection units 9 are provided at the individual units of the information processing apparatus 1 and each include a sensor for detecting a status of the information processing apparatus 1. For example, the status detection units 9 detect the following statuses:

(a) failure status (a failure of an apparatus, a network connection failure, a paper jam, etc.);

(b) remaining amount status (a remaining amount of paper in a tray, a remaining amount of toner in a toner cartridge, etc.); and (c) process status (printing in progress, sending in progress, etc.)

The status detection units 9 each transmit a message by transmitting a code corresponding to detected contents (see FIG. 2) to the controller 2. Transmission of a code is an example of notification of a message. Statuses detected by the status detection units 9 are not limited to the above. The status detection units 9 may detect other statuses. The status detection units 9 may directly transmit messages.

(Configuration of Message Categorization Table)

FIG. 2 is a diagram illustrating an example of the message categorization table 310. The message categorization table 310 includes a "code" field in which a code uniquely provided to a message is registered, a "main purpose" field in which information for categorizing a message according to a main purpose is registered, a "sub-purpose" field in which information for categorizing a message according to a sub-purpose is registered, a "layer" field in which a layer in which a message notification screen is displayed is registered, a "display mode" field in which a display mode representing whether a message notification screen is displayed as full-screen display or pop-up display is registered, a "message" field in which contents of a message in a message notification screen are registered, a "sub-application" field in which a sub-application is registered, and a "priority" field in which the priority of a message is registered. Display modes for all the codes may be implemented as full-screen display.

Codes registered in the "code" field are categorized into three types according to the main purpose. That is, in the case where the main purpose is error notification, "E001", "E002", and so on are used as codes, in the case where the main purpose is warning (except for warning regarding an operation), "W001", "W002", and so on are used as codes, and in the case where the main purpose is notification regarding an operation, "I001", "I002", and so on are used as codes. A larger value registered in the "priority" field indicates a higher priority. Priority is determined based on the combination of a main purpose and a sub-purpose. The highest priority is provided for a case where the main purpose is error notification, the next highest priority is provided for a case where the main purpose is warning (except for warning regarding an operation), and the lowest priority is provided for a case where the main purpose is notification regarding an operation.

In this exemplary embodiment, priority is stored in association with a message as described above. However, a method for storing priority in association with an event may also be adopted.

The reception unit 20 receives a function selected on the menu screen displayed on the operation display 4. On the menu screen, functions that may be executed by the information processing apparatus 1, such as scan, print, and ScanToMail, are displayed.

The notification unit 21 determines whether or not there is an inconvenience such as insufficiency in input information regarding a sub-application received by the reception unit 20. In the case where there is an inconvenience, the notification unit 21 notifies the display controller 22 of a code corresponding to a message indicating the inconvenience.

In the case where a different message is notified while a message notification screen including a notified message is being displayed on the display screen of the operation display 4, when the priority of the different message is higher than the priority of the message being displayed, the display controller 22 performs control such that a message notification screen including the different message is preferentially displayed on the display screen.

Specifically, as an example in which a message notification screen including a different message is preferentially displayed on the display screen, the display controller 22 may hold the message notification screen including the different message in the screen information storing unit 34 and display the message notification screen including the different message on the display screen when an instruction to close the message notification screen being displayed is issued. Furthermore, as another example in which a message notification screen including a different message is preferentially displayed on the display screen, the display controller 22 may hold a message notification screen being displayed in the screen information storing unit 34 while displaying the message notification screen including the different message on the display screen and display the held message notification screen on the display screen when an instruction to close the message notification screen including the different message is issued.

In the case where a different message is notified while a message notification screen is being displayed on the display screen, when the different message relates to any of the sub-applications 30*b* to 30*d* different from the message notification screen being displayed, the display controller 22 may cause a message notification screen including the different message to be held in the screen information storing unit 34 without preferentially displaying it and display the held message notification screen on the display screen when the corresponding one of the sub-applications 30*b* to 30*d* is selected.

The display controller 22 combines screens written in memory regions corresponding to the selected sub-application, that is, screens of four layers, and displays the combined screens on the operation display 4.

The display controller 22 refers to the message categorization table 310 in which information about in which memory region of the display memory 5 corresponding to a layer a message is to be written is registered according to the priority of the message, and writes a message notification screen in a memory region of the display memory 5.

The display controller 22 writes a message with a higher priority in a memory region of the display memory 5 corresponding to a layer on a more front side. The display controller 22 full-screen-displays or pop-up-displays a message notification screen on the display screen in accordance with the display mode of the message categorization table 310. Pop-up display is an example of partial-screen display.

When an execution instruction is issued on a setting screen corresponding to a sub-application, the execution unit 23 performs corresponding processing by controlling the scanner unit 6, the printer unit 7, or the communication unit 8.

(Operation of Exemplary Embodiments)

Next, an example of an operation of the information processing apparatus 1 according to an exemplary embodiment will be explained with reference to FIGS. 3, 4, 5A, 5B, 6A, and 6B.

(1) Basic Operation

Figure 3:
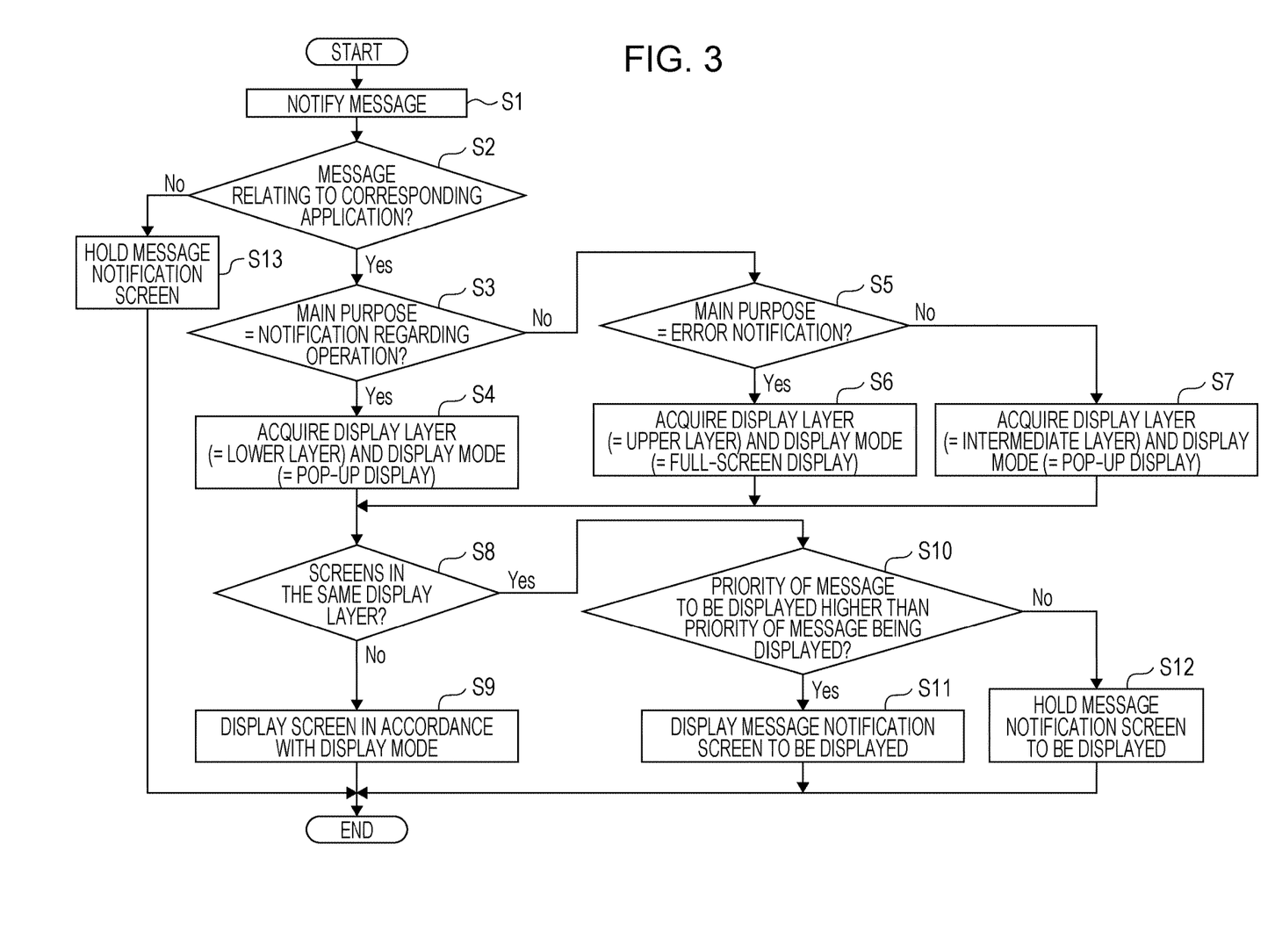
FIG. 3 is a flowchart illustrating an example of an operation of the information processing apparatus.

An example of an operation of the information processing apparatus 1 regarding display of a message notification screen will be explained below with reference to a flowchart in FIG. 3.

When the power of the information processing apparatus 1 is turned on, the display controller 22 reads a menu screen from the screen information storing unit 32 and displays the read menu screen on the display screen of the operation display 4. As functions that may be executed by the information processing apparatus 1, for example, "scan", "print", and "ScanToMail" are displayed on the menu screen.

A user performs a touch operation to select any of the functions on the menu screen displayed on the operation display 4.

The display controller 22 writes into the display pointer storing unit 33 a column number of the display memory 5 that corresponds to a sub-application which controls the selected function. The display controller 22 also reads a setting screen for the selected function from the screen information storing unit 32, and writes the setting screen in a memory region of the display memory 5 in the first row corresponding to the background layer and in the corresponding column.

The status detection units 9 detect the status of the information processing apparatus 1, and notify the controller 2 of a code corresponding to a message. When there is an insufficiency in input information with respect to the setting screen, the notification unit 21 notifies the display controller 22 of a code corresponding to a message indicating the insufficiency.

When the display controller 22 is notified of a message (in actuality, a code) by the status detection unit 9 via the reception unit 20 or when the display controller 22 is notified of a message (in actuality, a code) by the notification unit 21 (S1), the display controller 22 determines whether or not the notified message relates to the application that is currently selected (S2). Specifically, the display controller 22 determines whether or not a sub-application corresponding to a column number stored in the display pointer storing unit 33 is the same as a sub-application corresponding to a code registered in the message categorization table 310.

In the case where the sub-applications are the same (S2: Yes), the display controller 22 determines whether or not the notified message relates to the application that is currently selected and the main purpose of the notified message is notification regarding an operation (S3). Specifically, the display controller 22 determines, by referring to the message categorization table 310 on the basis of the notified code, whether or not the main purpose of the message is notification regarding an operation.

In the case where the main purpose is notification regarding an operation (S3: Yes), the display controller 22 acquires information of a memory region (lower layer) of the display memory 5 that corresponds to the code and the display mode (pop-up display) of a message notification screen from the message categorization table 310 (S4).

In the case where the main purpose is not notification regarding an operation in step S3 (S3: No), the display controller 22 determines whether or not the main purpose is error notification (S5). In the case where the main purpose is error notification (S5: Yes), the display controller 22 acquires information of a memory region (upper layer) of the display memory 5 that corresponds to the code and the display mode (full-screen display) of a message notification screen from the message categorization table 310 (S6).

In the case where the main purpose is not error notification in step S5 (S5: No), the display controller 22 acquires information of a memory region (intermediate layer) of the display memory 5 that corresponds to the code and the display mode (pop-up display) of a message notification screen from the message categorization table 310 (S7).

After step S4, S6, or S7, the display controller 22 determines whether or not screens are written in memory regions corresponding to the same display layer (S8). In the case where screens are not written in memory regions corresponding to the same display layer (S8: No), the display controller 22 reads the message notification screen corresponding to the code from the screen information storing unit 32, writes the read message notification screen into the memory region acquired in step S4, S6, or S7, and displays the message notification screen on the display screen of the operation display 4 in accordance with the display mode acquired in step S4, S6, or S7 (S9).

In the case where screens are written in memory regions corresponding to the same display layer in step S8 (S8: Yes), the display controller 22 determines, based on the message categorization table 310, whether or not the priority of the message to be displayed is higher than the priority of the message that is being displayed (S10).

In the case where the priority of the message to be displayed is higher than the priority of the message being displayed (S10: Yes), the display controller 22 stores the message notification screen being displayed in the screen information storing unit 34, reads a message notification screen including the message to be displayed from the screen information storing unit 32, writes the read message notification screen into the memory region acquired in step S4, S6, or S7, and displays the message notification screen on the operation display 4 in accordance with the display mode acquired in step S4, S6, or S7 (S11).

In the case where the priority of the message to be displayed is lower than or equal to the priority of the message being displayed in step S10 (S10: No), the message notification screen to be displayed is stored in the screen information storing unit 34 without displaying it on the operation display 4 (S12).

Figure 4:
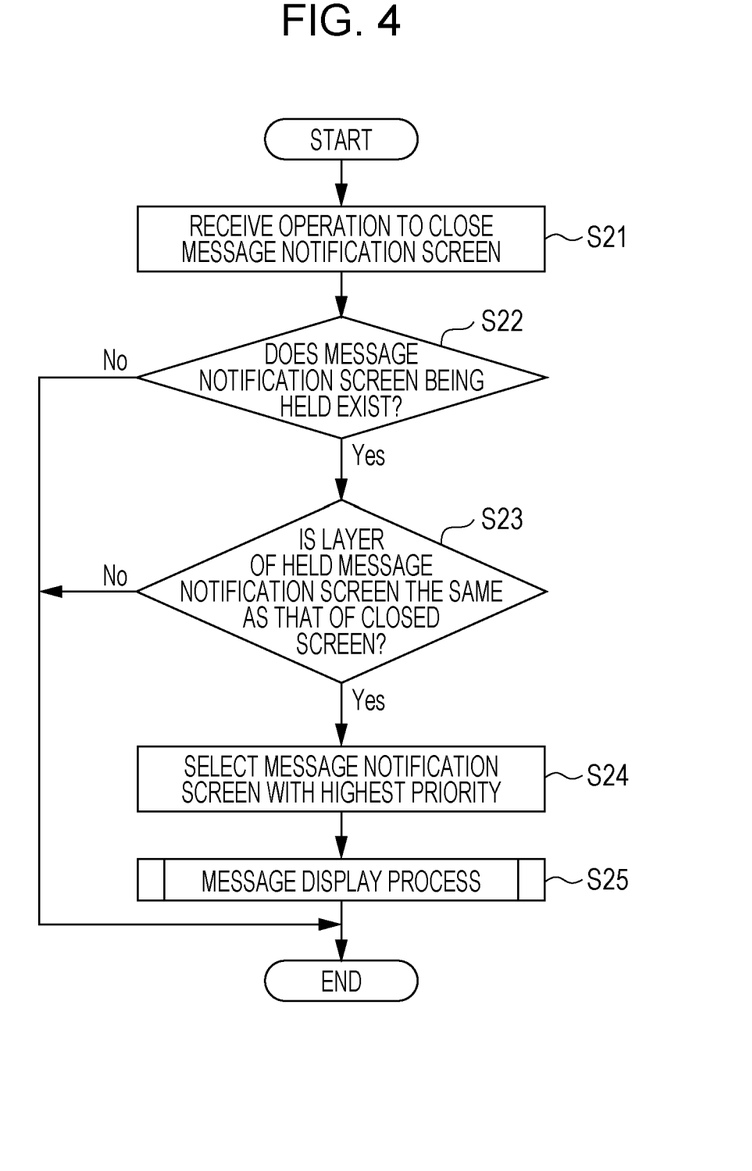
FIG. 4 is a flowchart illustrating an example of an operation of the information processing apparatus.

Next, an example of an operation of the information processing apparatus 1 regarding display of a message notification screen held in the screen information storing unit 34 in step S11 or S12 will be explained with reference to a flowchart in FIG. 4.

When the reception unit 20 receives an operation on the "close" button on the message notification screen displayed on the operation display 4 (S21), the display controller 22 determines whether or not there is a screen held in the screen information storing unit 34 (S22). In the case where there is no screen being held (S22: No), the process ends. In the case where there is a screen being held (S22: Yes), the display controller 22 determines whether or not the layer of the message notification screen held in the screen information storing unit 34 is the same as the layer of the closed screen (S23).

In the case where the layers are not the same (S23: No), the process ends. In the case where the layers are the same (S23: Yes), a message notification screen with the highest priority is selected (S24), and the process proceeds to the message display processing in FIG. 3, where the selected message notification screen is displayed (S25).

(2) Specific Operation

A case where ScanToMail is selected as a function will be described below.

When the power of the information processing apparatus 1 is turned on, the display controller 22 reads a menu screen from the screen information storing unit 32 and displays the read menu screen on the display screen of the operation display 4.

For example, a user performs a touch operation to select "ScanToMail" on the menu screen displayed on the operation display 4. The display controller 22 writes a column number (third column) of the display memory 5 that corresponds to the third sub-application 30d that controls the selected "ScanToMail" into the display pointer storing unit 33.

The display controller 22 reads a setting screen 320 (see FIG. 5A) from the screen information storing unit 32, and writes the setting screen 320 into the memory region $E_{13}$ of the display memory 5 in the first row corresponding to the background layer and in the third column corresponding to "ScanToMail".

When the setting screen 320 (see FIG. 5A) is written into the memory region $E_{13}$ of the display memory 5, the setting screen 320 is displayed in a background layer 50.

Figure 5A:
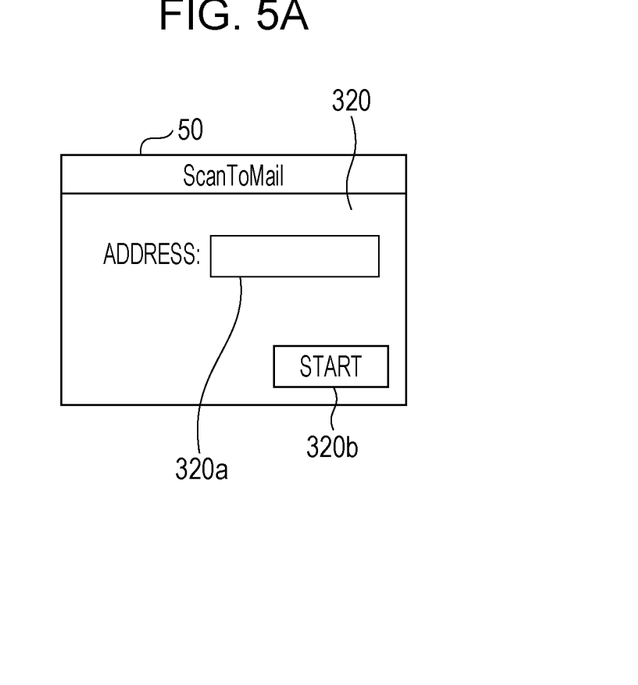
FIG. 5A is a diagram illustrating an example of a setting screen.

FIG. 5A is an example of the setting screen 320 for "ScanToMail". The setting screen 320 contains an address input frame 320a and a "start" button 320b. No screen is displayed in a layer on a front side relative to the background layer 50. Therefore, only the setting screen 320 for "ScanToMail" is displayed on the operation display 4.

Next, for example, the user performs a touch operation on the "start" button 320b without inputting an address in the address input frame 320 on the setting screen 320 for "ScanToMail". The reception unit 20 receives the touch operation on the "start" button 320b.

The notification unit 21 determines that there is an insufficiency in input information on the setting screen 320 for "ScanToMail" received by the reception unit 20. The notification unit 21 notifies the display controller 22 of a code (I001) (see FIG. 2) corresponding to a message notifying that there is an insufficiency in input information (S1).

The display controller 22 determines whether or not the message corresponding to the notified code (I001) relates to an application that is currently selected (S2). In this example, it is determined that the message corresponding to the notified code (I001) relates to the application that is currently selected (S2: Yes), it is determined whether or not the main purpose of the notified message is notification regarding an operation (S3). In the case where the code (I001) is notified while "ScanToMail" is running, the main purpose of the code (I001) is notification regarding an operation (S3: Yes). Therefore, the display controller 22 acquires information of the memory region (lower layer) of the display memory 5 that corresponds to the code (I001) and the display mode (pop-up display) of a message notification screen from the message categorization table 310 (S4).

In the case where no screen is written in a memory region corresponding to the lower layer (S8: No), the display controller 22 reads a message notification screen corresponding to the code (I001) from the screen information storing unit 32, writes the read message notification screen into the memory region $E_{23}$ in the second row and the third column of the display memory 5, and provides pop-up display on the display screen of the operation display 4 (S9).

Figure 5B:
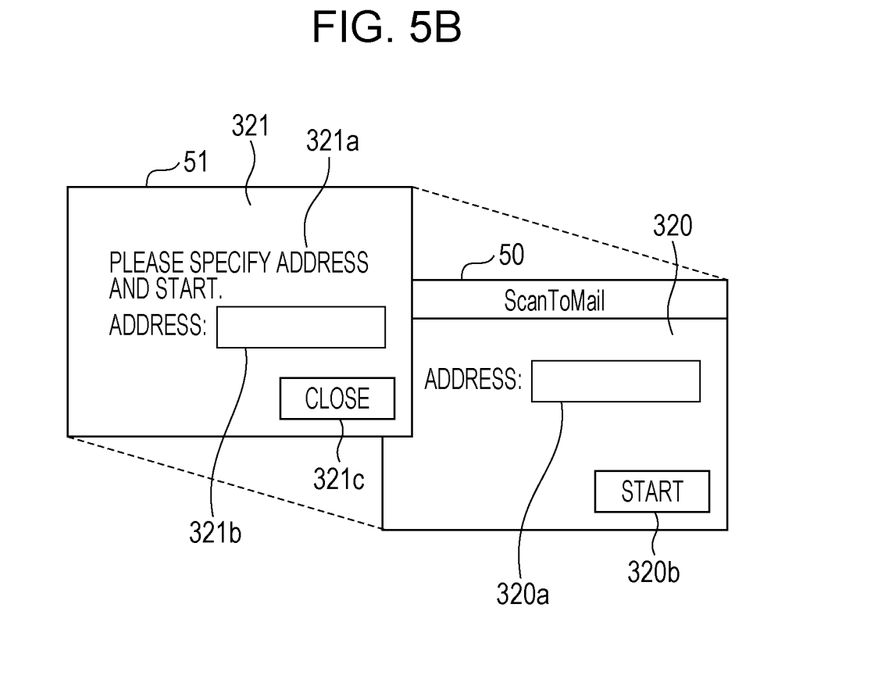
FIG. 5B is a diagram illustrating an example of a message notification screen.

As illustrated in FIG. 5B, a message notification screen 321 displayed in a lower layer 51 is pop-up displayed on the setting screen 320 for "ScanToMail. The message notification screen 321 contains a message 321a "Start is not available because no address is specified.", an address input frame 321b, and a "close" button 321c.

In the case where the status detection unit 9 detects a network connection status while the message notification screen 321 illustrated in FIG. 5B is being displayed on the operation display 4, a code (E002) corresponding to the detected contents is notified to the controller 2 (S1).

The reception unit 20 of the controller 2 receives the code (E002). Regarding the code (E002), the main purpose is error notification (S5: Yes). Therefore, the display controller 22 acquires information of the memory region (upper layer) of the display memory 5 that corresponds to the code and the display mode (full-screen display) of a message notification screen from the message categorization table 310 (S6).

In the case where no screen is written in a memory region corresponding to the upper layer (S8: No), the display controller 22 reads a message notification screen corresponding to the code (E002) from the screen information storing unit 32, writes the read message notification screen into the memory region $E_{43}$ in the fourth row (upper layer) and the third column of the display memory 5, and provides full-screen display on the operation display 4 (S9).

Figure 6A:
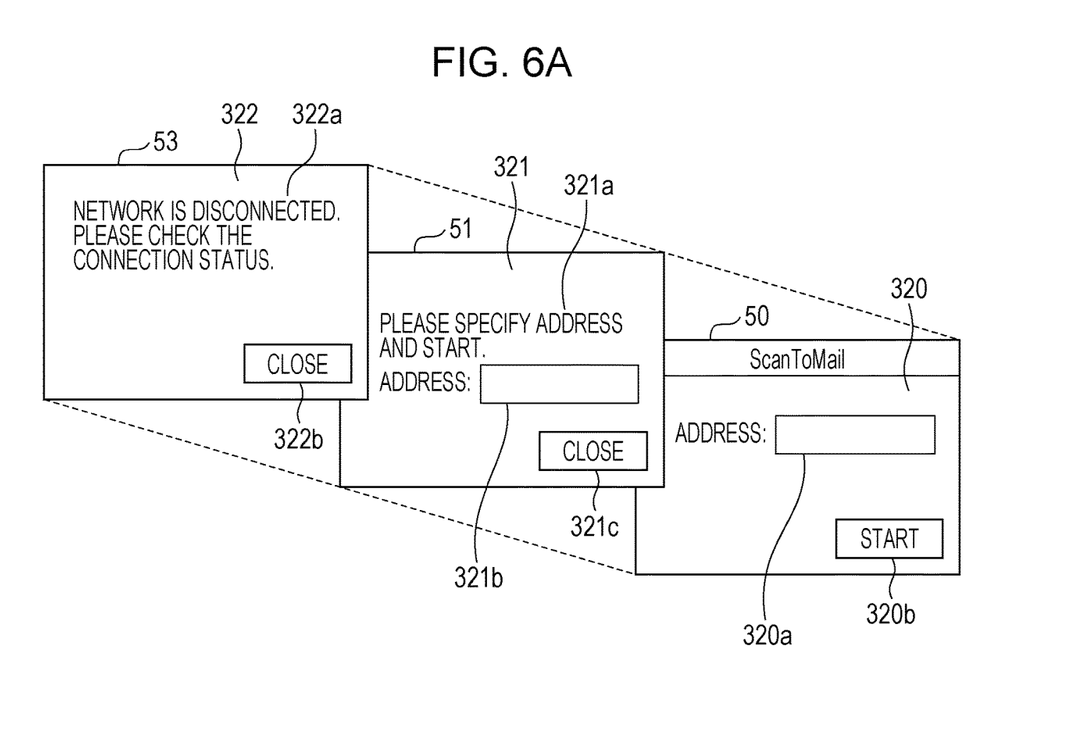
FIGS. 6A and 6B are diagrams illustrating examples of a message notification screen.

As illustrated in FIG. 6A, a message notification screen 322 displayed in an upper layer 53 is full-screen-displayed on the operation display 4. The message notification screen 322 contains a message 322a "Please check the connection status." and a "close" button 322b.

Next, as illustrated in FIG. 6A, a case where a failure has occurred in an apparatus while the message notification screen 322 notifying a network connection failure is being displayed will be explained.

For example, the status detection unit 9 detects a failure of an apparatus while the message notification screen 322 notifying a network connection failure is being displayed, and a code (E001) is notified to the controller 2. The reception unit 20 of the controller 2 receives the code (E001). Regarding the code (E001), the main purpose is error notification (S5: Yes). Therefore, the display controller 22 acquires information of the memory region (upper layer) of the display memory 5 that corresponds to the code (E001) and the display mode (full-screen display) of a message notification screen from the message categorization table 310 (S6). The screen of the code (E002) exists in a memory region corresponding to the same upper layer (S8: Yes). Therefore, comparison of priorities of the messages is performed (S10).

The priority of the code (E001) to be displayed is 10, whereas the priority of the code (E002) being displayed is 9 (S10: Yes). Therefore, the display controller 22 reads the message notification screen corresponding to the code (E001) with a higher priority from the screen information storing unit 32, writes the read message notification screen into the memory region $E_{43}$ in the fourth row (upper layer) and the third column of the display memory 5, and provides full-screen display on the operation display 4. At this time, the message notification screen 322 illustrated in FIG. 6A is held in the screen information storing unit 34.

Figure 6B:
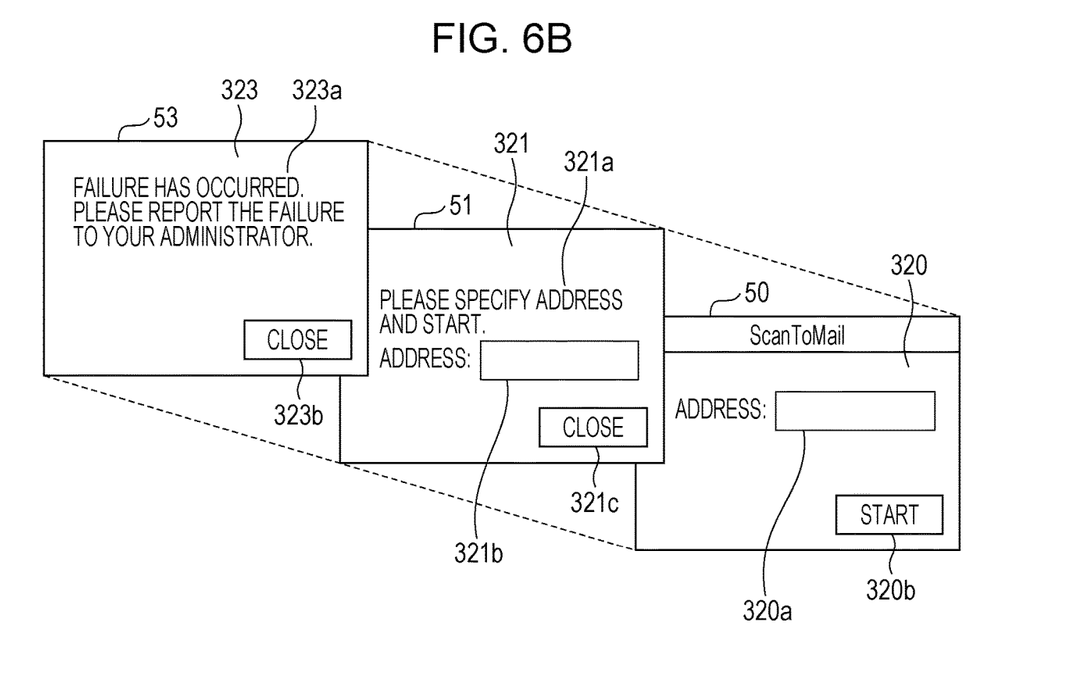

As illustrated in FIG. 6B, a message notification screen 323 displayed in the upper layer 53 is full-screen-displayed on the operation display 4. The message notification screen 323 contains a message 323a "Failure has occurred. Please report the failure to your administrator." and a "close" button 323b.

When the "close" button 323b on the message notification screen 323 illustrated in FIG. 6B is operated, the message notification screen 322 is read from the screen information storing unit 34 and is displayed on the operation display 4.

As described above, a message regarding a sub-application that is being used by a user is displayed, whereas a message regarding a sub-application that is not being used by the user is not displayed even if the priority of the message is high. Therefore, noise to the user is not provided.

[Modifications]

The exemplary embodiments of the present invention have been described above. However, exemplary embodiments of the present invention are not limited to the foregoing exemplary embodiments. Various modifications and implementation may be made without departing from the scope of the present invention.

Part or all of the individual units of the controller 2 may be hardware circuits such as field programmable gate arrays (FPGAs) or application specific integrated circuits (ASICs).

Furthermore, part of components in the foregoing exemplary embodiments may be omitted or changed without departing from the scope of the present invention. Furthermore, in flows in the foregoing exemplary embodiments, addition, deletion, change, replacement, or the like of steps may be made without departing from the scope of the present invention. Furthermore, a program used in the foregoing exemplary embodiments may be recorded in a computer-readable recording medium such as a compact disc-read only memory (CD-ROM) and provided. Furthermore, a program used in the foregoing exemplary embodiments may be stored in an external server such as a cloud server and used via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
   control a display screen to display a plurality of error messages corresponding to error events occurring in the information processing apparatus, wherein
      an error event is an occurrence of a failure in the information processing apparatus, and
      an error message is a notification of the occurrence of the failure in the information processing apparatus;
   in a case where a first error event corresponding to a first error message occurs in the information processing apparatus when a user is using an application of the information processing apparatus, and a second error message corresponding to a second error event is being displayed on the display screen when the first error event occurs, determine whether the first error event and the second error event occur in a same application;
   when the first error event and the second error event occur in the same application, and the first error message has a higher priority than the second error message, control the display screen to preferentially display the first error message; and
   when the first error event and the second error event do not occur in the same application, or when the first error message does not have a higher priority than the second error message, control the display screen to continue displaying the second error message without displaying the first error message.

2. The information processing apparatus according to claim 1, wherein
the processor is further configured to control the display screen to display the first error message in response to a user's indication to close the second error message.

* * * * *